US012523962B2

(12) United States Patent
Okazaki

(10) Patent No.: US 12,523,962 B2
(45) Date of Patent: Jan. 13, 2026

(54) IMAGE FORMING APPARATUS HAVING A COVER TO ALTERNATELY CLOSE AN INSERTION PORT FOR SHEET FEEDING OR ATTACHMENT PORT FOR CARTRIDGE REPLACEMENT

(71) Applicant: CANON KABUSHIKI KAISHA, Tokyo (JP)

(72) Inventor: Shunsuke Okazaki, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/791,740

(22) Filed: Aug. 1, 2024

(65) Prior Publication Data

US 2025/0060699 A1 Feb. 20, 2025

(30) Foreign Application Priority Data

Aug. 14, 2023 (JP) ................................ 2023-131801

(51) Int. Cl.
*G03G 21/16* (2006.01)
*G03G 15/00* (2006.01)
(Continued)

(52) U.S. Cl.
CPC ..... *G03G 21/1842* (2013.01); *G03G 15/0865* (2013.01); *G03G 15/6502* (2013.01);
(Continued)

(58) Field of Classification Search
CPC ........... G03G 15/0865; G03G 15/6502; G03G 15/6511; G03G 21/1604; G03G 21/1633;
(Continued)

(56) References Cited

U.S. PATENT DOCUMENTS

2015/0050059 A1 2/2015 Sato et al.
2018/0246458 A1 8/2018 Okamoto
2019/0361390 A1* 11/2019 Adachi ............. G03G 21/1647

FOREIGN PATENT DOCUMENTS

JP 2005272040 A 10/2005
JP 2015036764 A 2/2015

(Continued)

*Primary Examiner* — Sophia S Chen
(74) *Attorney, Agent, or Firm* — ROSSI, KIMMS & McDOWELL LLP

(57) ABSTRACT

An image forming apparatus includes an apparatus body including a sheet feeding unit, an insertion port in which the sheet fed by sheet feeding unit is inserted, a cartridge that is configured to store toner, the cartridge being attachably and detachably supported by the apparatus body, an attachment/detachment port through which the cartridge passes, and a cover configured to move to a first position where the cover closes the insertion port and the attachment/detachment port and a second position where the cover opens the insertion port and the attachment/detachment port. In a state in which the cover is positioned at the second position, the sheet feeding unit is capable of feeding the sheet that has been inserted to the insertion port, and the cartridge is capable of being attached to and detached from the apparatus body via the attachment/detachment port.

13 Claims, 10 Drawing Sheets

(51) Int. Cl.
*G03G 15/08* (2006.01)
*G03G 21/18* (2006.01)

(52) U.S. Cl.
CPC ..... *G03G 15/6511* (2013.01); *G03G 21/1604* (2013.01); *G03G 21/1633* (2013.01); *G03G 21/1647* (2013.01); *G03G 21/1676* (2013.01); *G03G 21/1695* (2013.01); *G03G 21/1814* (2013.01)

(58) Field of Classification Search
CPC ........... G03G 21/1647; G03G 21/1676; G03G 21/1695; G03G 21/1814; G03G 21/1844
See application file for complete search history.

(56) References Cited

FOREIGN PATENT DOCUMENTS

| | | |
|---|---|---|
| JP | 2018141876 A | 9/2018 |
| JP | 2023050032 A | 4/2023 |

* cited by examiner

IMAGE FORMING APPARATUS HAVING A COVER TO ALTERNATELY CLOSE AN INSERTION PORT FOR SHEET FEEDING OR ATTACHMENT PORT FOR CARTRIDGE REPLACEMENT

BACKGROUND OF THE INVENTION

Field of the Invention

This disclosure relates to an image forming apparatus that forms an image on a sheet.

Description of the Related Art

Hitherto, a laser printer including a casing, an opening portion that is disposed in a manner extending across one side surface and a top surface of the casing, a front cover that covers and releases the opening portion is proposed (refer to Japanese Patent Laid-Open No. 2018-141876). This laser printer includes a process cartridge that can be attached or detached with respect to the casing in a state in which the front cover is opened. A multipurpose tray is disposed in the front cover in an openable and closable manner, and, when the multipurpose tray is opened in a state in which the front cover is closed, it is possible to place a sheet on the multipurpose tray. This sheet is fed into the casing via a paper feeding port that is released when the multipurpose tray is opened.

However, in the laser printer of Japanese Patent Laid-Open No. 2018-141876 described above, in a case of replacing the process cartridge, it is necessary to open the front cover, and, in a case of feeding the sheet from the paper feeding port, it is necessary to open the multipurpose tray while keeping the front cover closed. Therefore, while a user needs to open only one or the other of the front cover or the multipurpose tray depending on a task at hand, it is difficult to determine which one of the front cover and the multipurpose tray to open, and usability is lowered.

SUMMARY OF THE INVENTION

According to an aspect of the present invention, an image forming apparatus includes an apparatus body including a sheet feeding unit that is configured to feed a sheet, an insertion port that is disposed in the apparatus body and in which the sheet fed by sheet feeding unit is inserted, a cartridge that is configured to store toner with which an image is formed on the sheet, the cartridge being attachably and detachably supported by the apparatus body, an attachment/detachment port that is disposed in the apparatus body and through which the cartridge passes in a case where the cartridge is attached to or detached from the apparatus body, and a cover that is openably and closably supported by the apparatus body and is configured to move to a first position where the cover closes the insertion port and the attachment/detachment port and a second position where the cover opens the insertion port and the attachment/detachment port. In a state in which the cover is positioned at the second position, the sheet feeding unit is capable of feeding the sheet that has been inserted to the insertion port, and the cartridge is capable of being attached to and detached from the apparatus body via the attachment/detachment port.

Further features of the present invention will become apparent from the following description of exemplary embodiments with reference to the attached drawings.

DESCRIPTION OF THE EMBODIMENTS

First Embodiment

Overall Configuration

Figure 1:
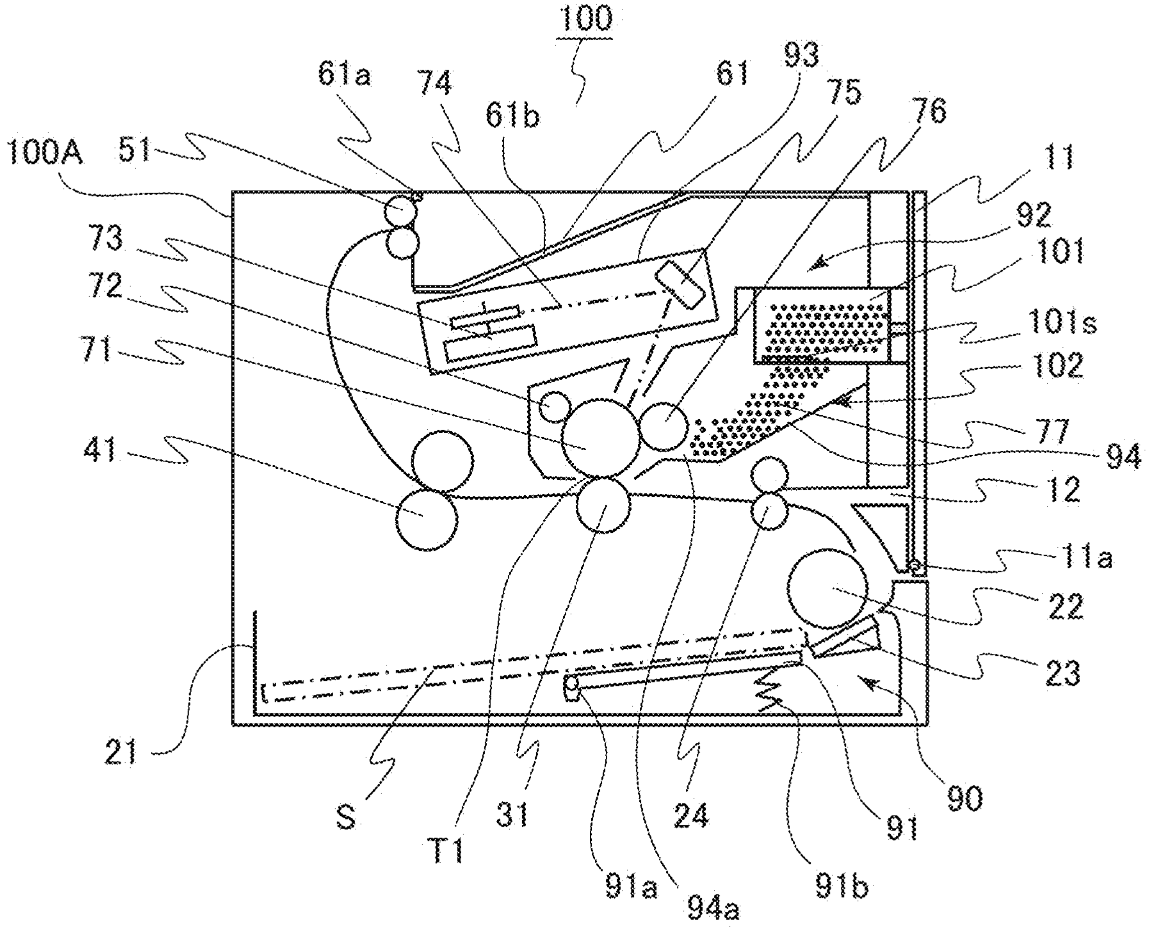
FIG. 1 is an overall schematic view illustrating a printer of a first embodiment.

First, a first embodiment of this disclosure will be described. A printer 100, serving as an image forming apparatus, is a laser beam printer of an electrophotographic system that forms a monochromic toner image. As illustrated in FIG. 1, the printer 100 includes a sheet feeding apparatus 90 that feeds a stacked sheet, and an image forming unit 92 that forms the image on the sheet fed by the sheet feeding apparatus 90. In addition, the printer 100 includes a fixing unit 41 that fixes the image transferred onto the sheet, and a sheet discharge roller pair 51 that discharges the sheet to a supporting surface 61*b* of a sheet discharge tray 61. In the present embodiment, the sheet includes paper such as a paper sheet and an envelope, a plastic film such as a sheet for an overhead projector (OHP), cloth, and the like.

When an image formation job is output to the printer 100, an image forming process is started by the image forming unit 92 based on image information input from such as an external computer connected to the printer 100. The image forming unit 92 includes a process cartridge 102, a toner cartridge 101, a laser scanner 93, and a transfer roller 31. The process cartridge 102 includes a photosensitive drum 71, serving as a rotatable image bearing member, and a charge roller 72, which is arranged along the photosensitive drum 71, and a developing unit 94. The photosensitive drum 71 and the transfer roller 31 form a transfer nip T1. The developing unit 94 includes a toner storage portion 94*a* that stores toner, and a developing roller 76 that develops an electrostatic latent image borne on the photosensitive drum 71 as the toner image using the toner stored in the toner storage portion 94*a*. The process cartridge 102 and the toner cartridge 101 are attachable and detachable with respect to an apparatus body 100A of the printer 100.

A light emitting portion 73 of the laser scanner 93 emits a laser beam 74 based on the input image information. After being reflected by a reflecting mirror 75 disposed in the laser scanner 93, this laser beam 74 is irradiated onto a surface of the photosensitive drum 71. At this time, the photosensitive drum 71 has been charged by the charge roller 72 beforehand, and, by being irradiated with the laser beam, the electrostatic latent image is formed on the photosensitive drum 71. Thereafter, this electrostatic latent image is developed by the developing roller 76 of the developing unit 94, and the monochromic toner image is formed on the photosensitive drum 71.

In parallel with the image forming process described above, the sheet S is fed from the sheet feeding apparatus 90. The sheet feeding apparatus 90 includes a cassette 21 drawable and attachable with respect to the apparatus body 100A, a pickup roller 22, and a separation pad 23 that comes into pressure contact with the pickup roller 22. In the cassette 21, an intermediate plate 91 capable of supporting the sheet S stored in the cassette 21 and capable of ascending around a pivot shaft 91*a* as a center, and a spring 91*b* urging the intermediate plate 91 upward are disposed.

The intermediate plate 91 is pressed downward by, for example, a cam, not shown, while resisting an urging force of the spring 91*b*, and ascends as the cam rotates when the image formation job is input. Then, an uppermost sheet S stacked on the intermediate plate 91 comes into contact with the pickup roller 22, and the pickup roller 22 becomes possible to feed the sheet S. To be noted, the intermediate plate 91 may be configured to be lifted from below by, for example, a lifter.

The sheet S supported by the intermediate plate 91 is fed by the pickup roller 22, and separated into one sheet at a time by the separation pad 23. The sheet S that has been separated into one sheet at a time is conveyed by a conveyance roller pair 24, and the conveyance roller pair 24 conveys the sheet S in synchronizing with a transfer timing of the toner image at the transfer nip T1. To be noted, the conveyance roller pair 24 may correct the skew of the sheet S by abutting a leading edge of the sheet S against the conveyance roller pair 24 that is in a stopped state.

The toner image on the photosensitive drum 71 is transferred onto the sheet S at the transfer nip T1 by an electrostatic load bias applied to the transfer roller 31. Predetermined heat and pressure are applied to the sheet S, onto which the toner image has been transferred, by the fixing unit 41, and the toner is melted and bonded (fixed). The sheet S that has passed through the fixing unit 41 is discharged outside of the printer 100 by the sheet discharge roller pair 51, and is supported on the supporting surface 61*b* of the sheet discharge tray 61.

In a case where the image is formed on both surfaces of the sheet S, the sheet S on whose first surface the image has been formed is switchbacked by the sheet discharge roller pair 51, and is conveyed to a duplex conveyance path (not shown). The duplex conveyance path guides the sheet S to the conveyance roller pair 24 again. Then, the image is formed on a second surface of the sheet S at the transfer nip T1, and the sheet S is discharged to the sheet discharge tray 61.

Figure 2:
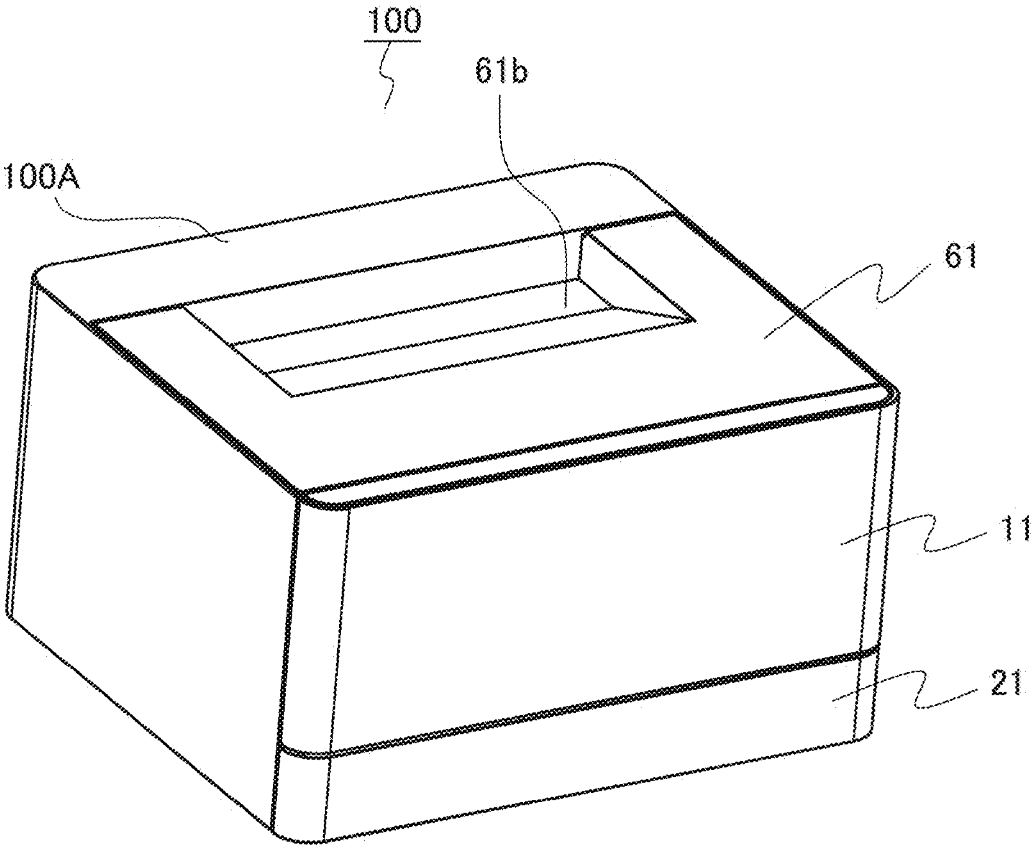
FIG. 2 is a perspective view illustrating the printer.

Here, as illustrated in FIG. 2, the printer 100 includes a front cover 11 supported by the apparatus body 100A in an openable and closable manner. The front cover 11, serving as a cover and a first cover, is movable to a closed position, serving as a first position illustrated in FIG. 1, and an opening position, serving as a second position illustrated in FIG. 3. In addition, the sheet discharge tray 61 described above is also supported by the apparatus body 100A in an openable and closable manner. The sheet discharge tray 61, serving as a second cover, is movable to a closed position, serving as a fifth position illustrated in FIG. 1, and an opening position, serving as a sixth position illustrated in FIG. 4.

That is, the printer 100 is configured by the apparatus body 100A, the cassette 21, the process cartridge 102, the toner cartridge 101, the front cover 11, and the sheet discharge tray 61. In other words, the apparatus body 100A is a part of the printer 100 excluding the cassette 21, the process cartridge 102, the toner cartridge 101, the front cover 11, and the sheet discharge tray 61.

Attachment and Detachment of Toner Cartridge

Figure 3:
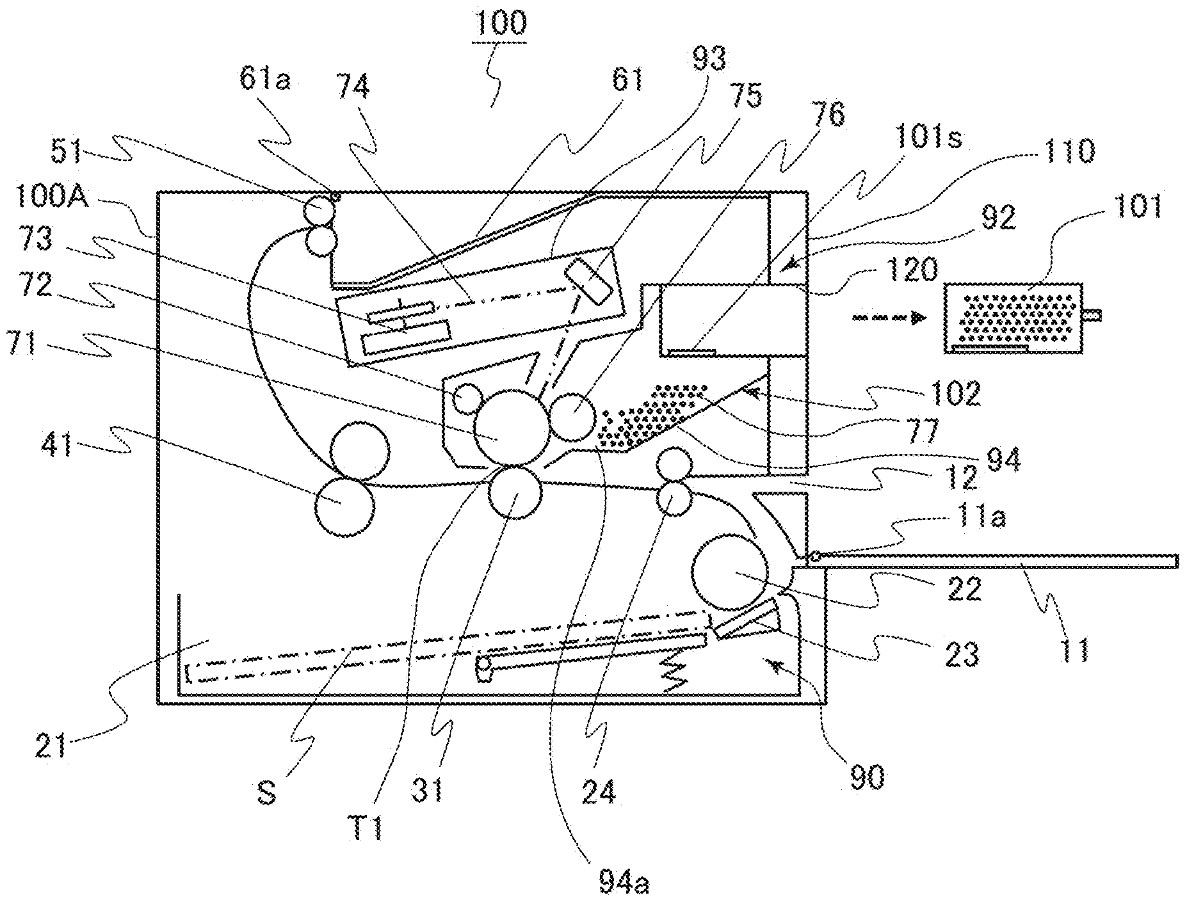
FIG. 3 is a cross-sectional view illustrating the printer.

Next, using FIG. 3, the attachment and detachment of the toner cartridge 101 with respect to the apparatus body 100A will be described. As illustrated in FIG. 3, the toner cartridge 101, serving as a cartridge, stores the toner for forming the image on the sheet. In addition, in a state in which the toner and process cartridges 101 and 102 are attached to the apparatus body 100A, the toner cartridge 101 is configured to supply the toner 77 to the toner storage portion 94*a* of the process cartridge 101 via a supply port 101*s*.

The apparatus body 100A includes a side surface 110 on a front side of the printer 100, and an attachment/detachment port 120, serving as a first attachment/detachment port, is disposed in the side surface 110. The side surface 110 extends in a gravity direction. The toner cartridge 101 passes through the attachment/detachment port 120 at a time of being attached or detached with respect to the apparatus body 100A. The side surface 110 of the apparatus body 100A is opened or closed by the front cover 11. That is, the front cover 11 is an exterior member configured to close (cover) the side surface 110 of the apparatus body 100A and the attachment/detachment port 120 at the closed position.

In addition, when the front cover 11 is positioned at the opening position, the side surface 110 of the apparatus body 100A and the attachment/detachment port 120 are opened (released). Thereby, a user can attach and detach the toner cartridge 101 with respect to the apparatus body 100A via the attachment/detachment port 120. To be noted, a supply port 101*s* may be closed when the front cover 11 is positioned at the opening position, and, thereby, it is possible to prevent the toner 77 from leaking outside of the toner cartridge 101.

Attachment and Detachment of Process Cartridge

Next, using FIG. 4, the attachment and detachment of the process cartridge 102 with respect to the apparatus body 100A will be described. As described above, in this embodiment, the photosensitive drum 71, the charge roller 72, and the developing unit 94, which includes the developing roller 76, are integrated as the process cartridge.

Figure 4:
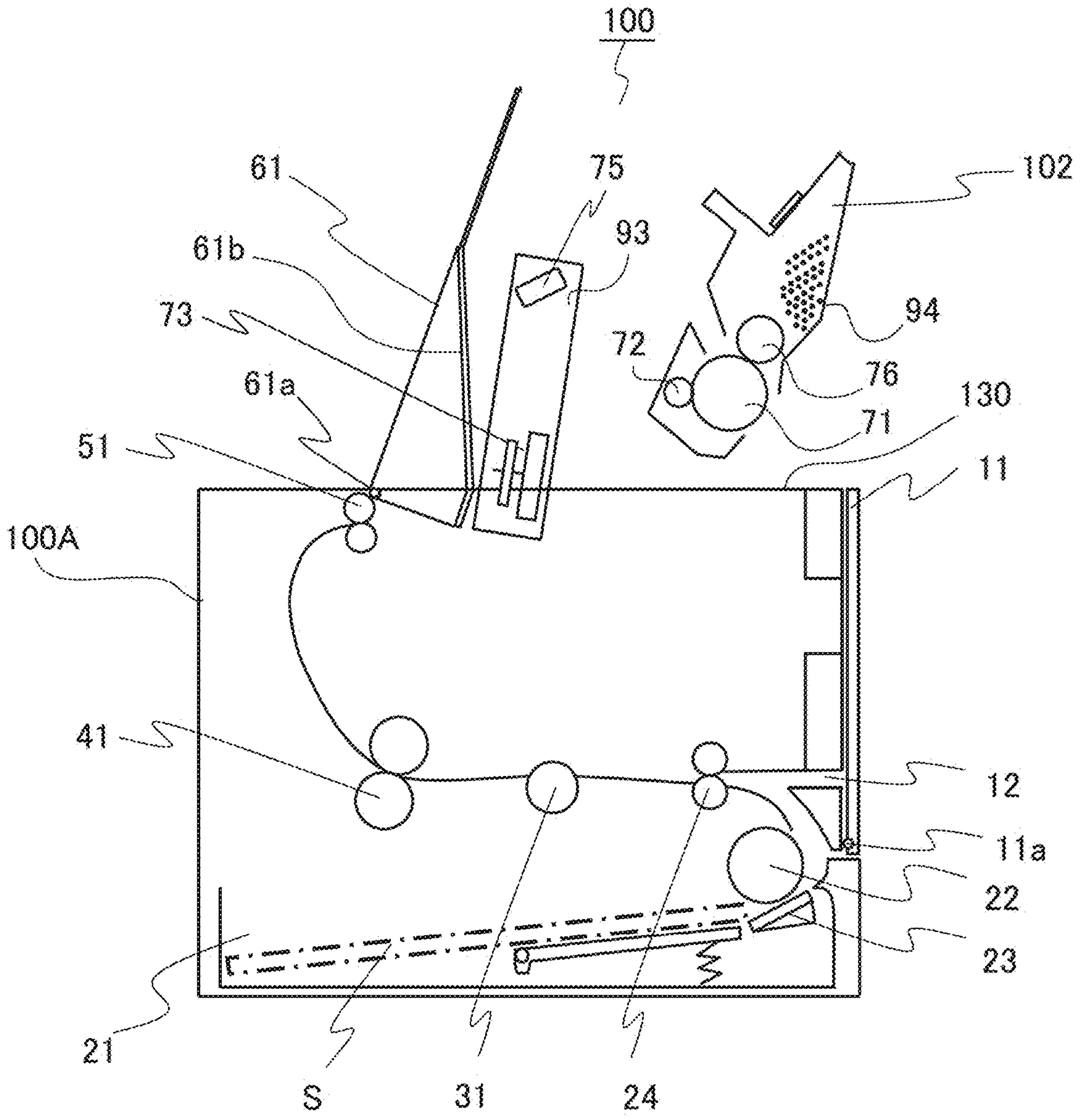
FIG. 4 is a perspective view illustrating a state in which a process cartridge is attached or detached.

As illustrated in FIG. 4, at a time of replacing the process cartridge 102, the user pivots the sheet discharge tray 61 to the opening position around a pivot shaft 61*a* as a center. Thereby, a process cartridge attachment/detachment port 130, serving as a second attachment/detachment port, disposed in the top surface of the apparatus body 100A is released. That is, the sheet discharge tray 61 is movable to the closed position closing (covering) the process cartridge attachment/detachment port 130 and the opening position opening (releasing) the process cartridge attachment/detachment port 130.

Then, in a state in which the sheet discharge tray 61 is positioned at the opening position, the user can attach or detach the process cartridge 102 with respect to the apparatus body 100A via the process cartridge attachment/detachment port 130. At the time of being attached or detached with respect to the apparatus body 100A, the process cartridge 102 passes through the process cartridge attachment/detachment port 130.

In addition, in this embodiment, the laser scanner 93, serving as an exposure unit, is integrally supported by the sheet discharge tray 61. Therefore, since, when the sheet discharge tray 61 is positioned at the opening position, also the laser scanner moves upward in conjunction with the sheet discharge tray 61, it is possible to ensure an opening amount sufficient for attaching or detaching the process cartridge 102.

Manual Sheet Feeding Port

Figure 5:
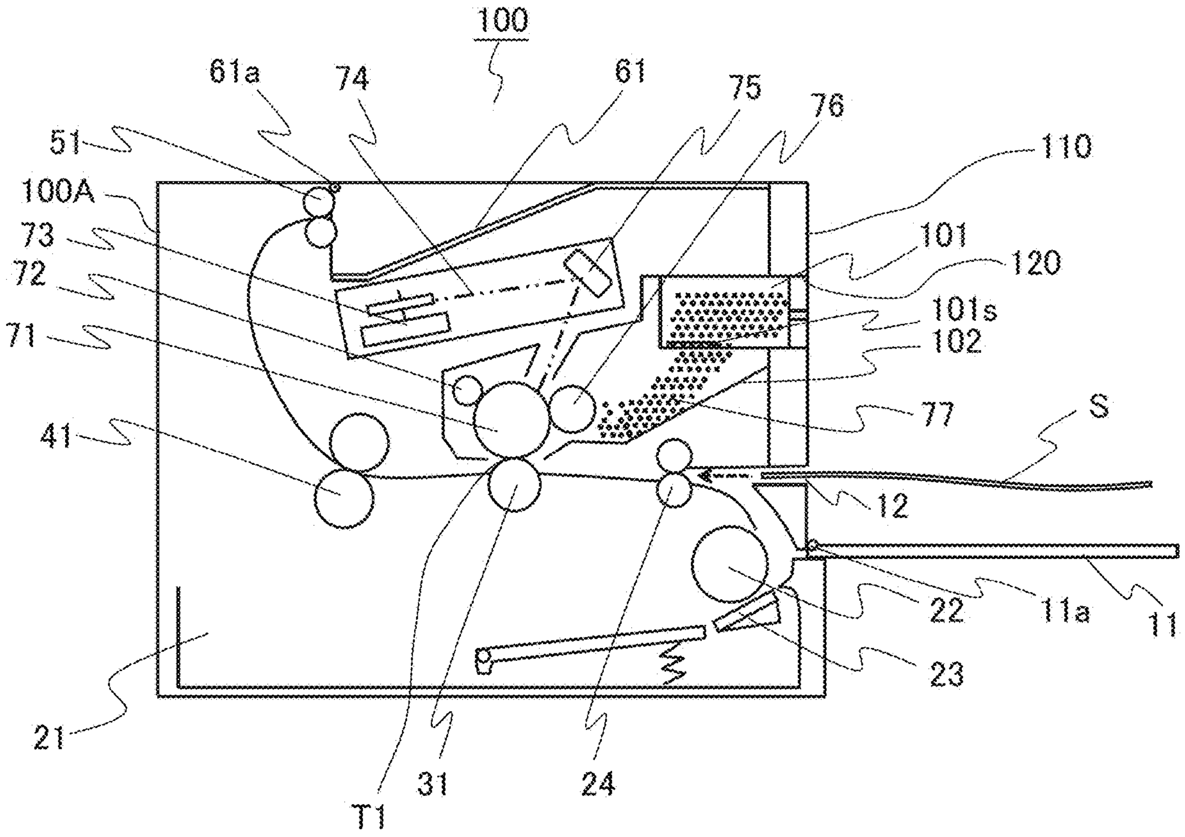
FIG. 5 is a cross-sectional view illustrating a state in which a sheet has been inserted to a manual sheet feed port.
Figure 6:
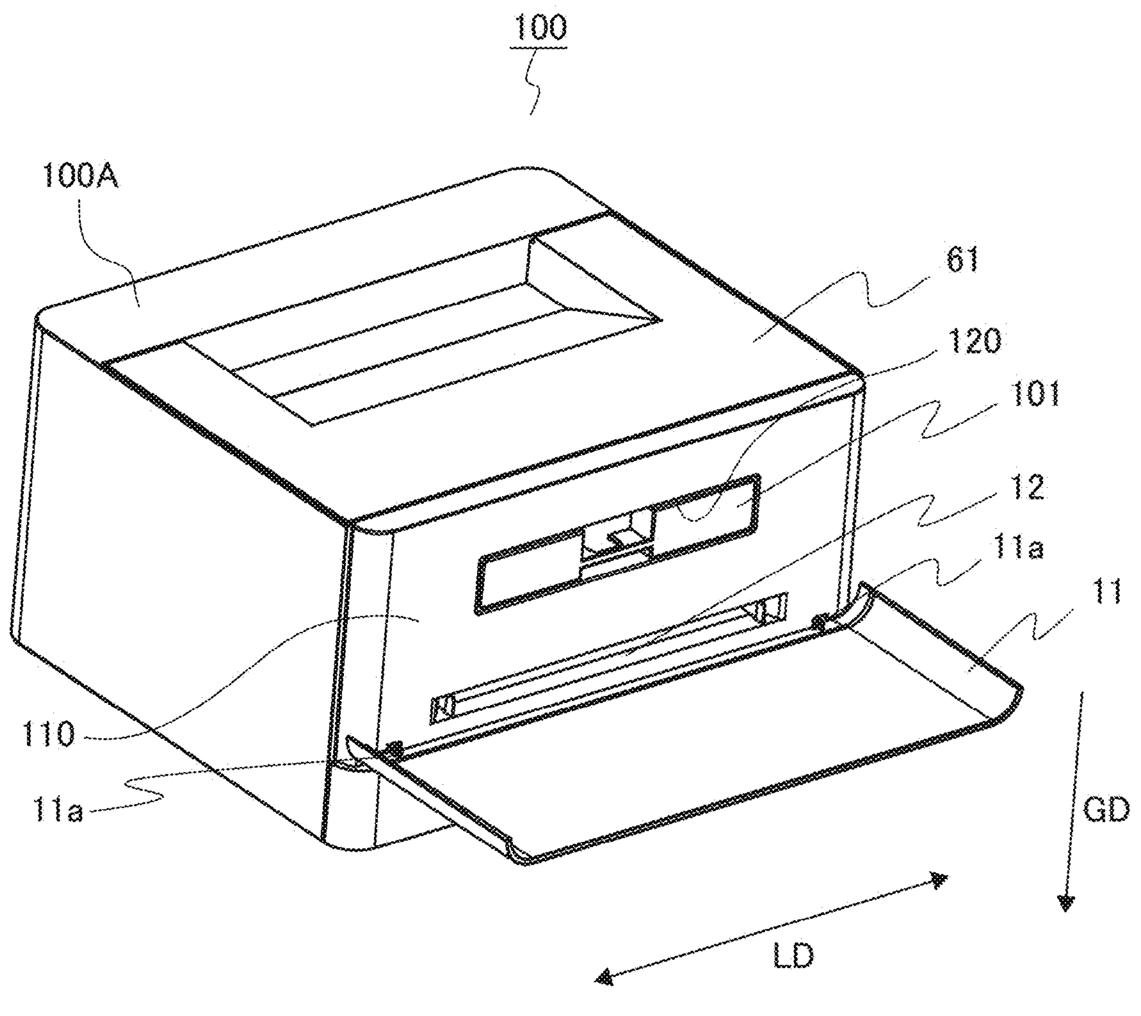
FIG. 6 is a perspective view illustrating the printer in a state in which a front cover is opened.

Next, using FIGS. 5 and 6, a manual sheet feeding port 12 of the apparatus boy 100A will be described. As illustrated in FIGS. 5 and 6, the manual sheet feeding port 12, serving as an insertion port, is disposed in the side surface 110 of the apparatus body 100A. The side surface 110 extends in the gravity direction GD. Each of the process cartridge attachment/detachment port 130 and the manual sheet feeding port 12 extends in a longitudinal direction LD of the process cartridge 101, and opens in a direction perpendicular to both of the gravity direction GD and the longitudinal direction LD. The longitudinal direction LD is a direction that is perpendicular to the gravity direction GD and parallel to a rotational axis direction of the developing roller 76. In addition, the process cartridge attachment/detachment port 130 is shorter than the manual sheet feeding port 12 in the longitudinal direction LD. The manual sheet feeding port 12 is closed (covered) by the front cover 11 which is positioned at the closed position, and is opened (released) when the front cover 11 is opened to the opening position. The printer 100 of this embodiment can accommodate manual sheet feeding by inserting the sheet from the manual sheet feeding port 12.

In a case of performing the manual sheet feeding, as illustrated in FIG. 5, the user pivots the front cover 11 to the opening position around a pivot shaft 11*a* as a center. Thereby, the manual sheet feeding port 12 is exposed outside of the printer 100, and it becomes possible to access the manual sheet feeding port 12. The user inserts a single sheet of the sheet S from the manual sheet feeding port 12 into the apparatus body 100A in an arrow direction of FIG. 5.

The sheet S is fed toward the transfer nip T1 by the conveyance roller pair 24, serving as a feeding unit, and, thereafter, by undergoing a process similar to a case of being fed from the cassette 21, the toner image is formed on the sheet S.

To be noted, when the front cover 11 is opened and light enters an interior of the apparatus body 100A via the attachment/detachment port 120, there is a risk that the photosensitive drum 71 may be inadvertently exposed to the light. Therefore, in this embodiment, a light-shielding member, not shown, is disposed in the apparatus body 100A, and, by shielding an external light by this light-shielding member, the photosensitive drum 71 is configured to be prevented from being exposed.

As described above, the front cover 11 is movable to the closed position closing (covering) the manual sheet feeding port 12 and the attachment/detachment port 120, and the opening position opening (releasing) the manual sheet feeding port 12 and the attachment/detachment port 120. In the state in which the front cover 11 is positioned at the opening position, the conveyance roller pair 24 can feed the sheet S inserted to the manual sheet feeding port 12, and the toner cartridge 101 can be attached to and detached from the apparatus body 100A via the attachment/detachment port 120.

Then, in either case of replacing (attaching/detaching) the toner cartridge 101 or feeding the sheet from the manual sheet feeding port 12, the user performs a work of opening the front cover 11 from the closed position to the opening position. Therefore, the user does not need to be confused about which cover to open depending on a task, and it is possible to enhance the usability by improving the intuitiveness of an operation of the printer 100.

In addition, since the manual sheet feeding port 12 is disposed in the side surface 110, which is not an exterior of the printer 100 and is covered by the front cover 11, of the apparatus body 100A, in the state in which the front cover 11 is positioned at the closed position, the manual sheet feeding port 12 is not exposed. Therefore, it is possible to design an appearance of the printer 100 with simplicity, and it is possible to improve design freedom and visual attractiveness.

Second Embodiment

Next, while a second embodiment of this disclosure will be described, the second embodiment is configured by further disposing an inner cover 13 to the apparatus body 100A of the first embodiment. Therefore, configurations similar to the first embodiment will be described by omitting illustrations or by putting the same reference characters on drawings.

Figure 7A:
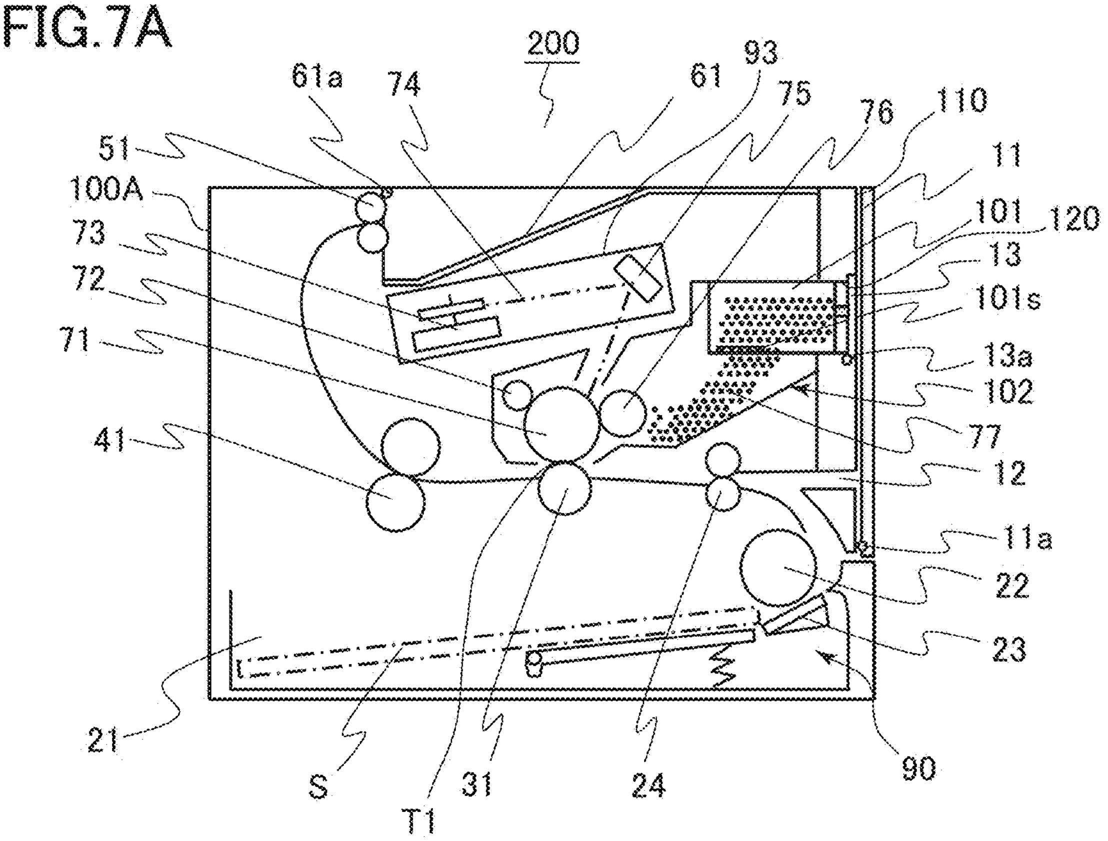
FIG. 7A is a cross-sectional view illustrating a printer of a second embodiment.

As illustrated in FIG. 7A, a printer 200 of this embodiment includes the inner cover 13. The inner cover 13 is supported by the apparatus body 100A in an openable and closable manner, and is movable to a closed position, serving as a third position, closing (covering) the attachment/detachment port 120 and an opening position, serving as a fourth position, opening (releasing) the attachment/detachment port 120. When the front cover 11 is positioned at the closed position, the inner cover 13 is arranged more inside of the apparatus body 100A than the front cover 11.

Figure 7B:
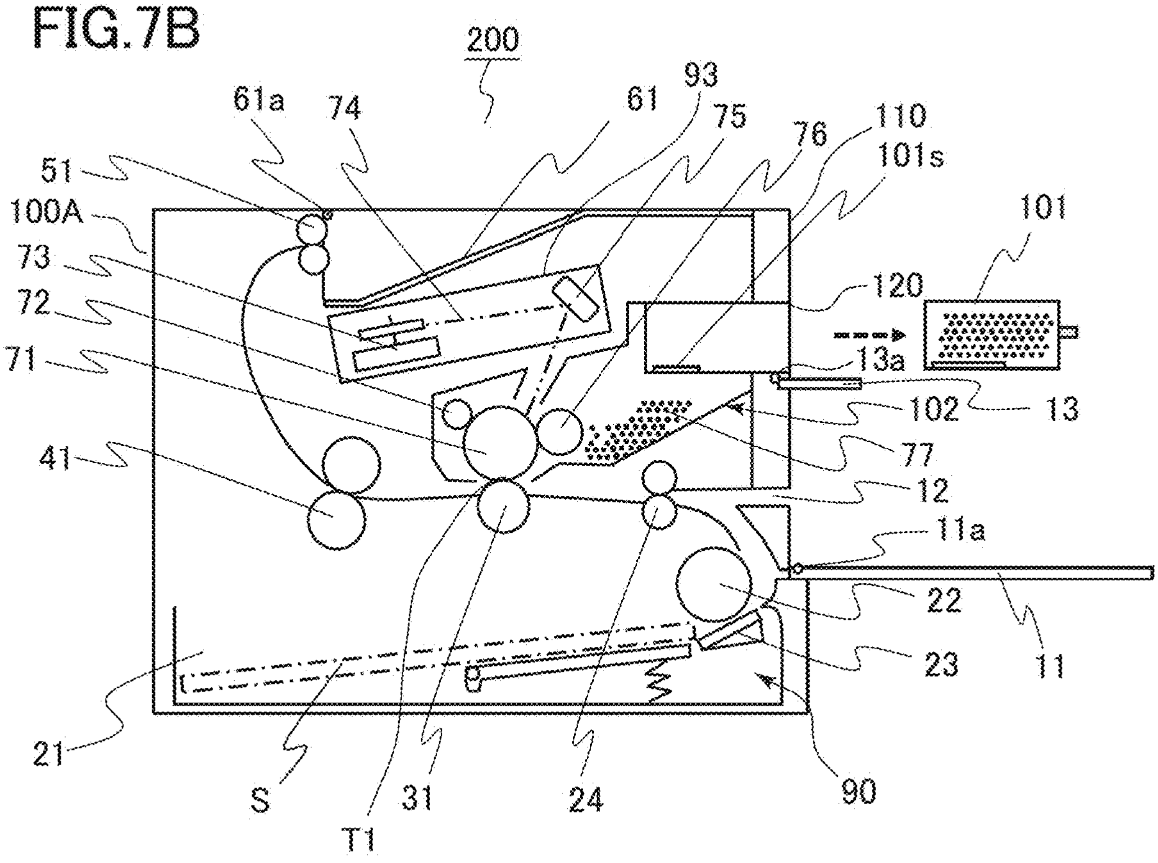
FIG. 7B is a cross-sectional view illustrating the printer in a state in which the front cover and an inner cover are opened.

At the time of attaching and detaching (replacing) the toner cartridge 101, as illustrated in FIG. 7B, first, the user pivots the front cover 11 to the opening position around the pivot shaft 11*a* as a center. Further, the user pivots the inner cover 13 to the opening position around a pivot shaft 13*a* as a center. Thereby, the attachment/detachment port 120 is exposed outside of the printer 100, and it becomes possible for the user to access the attachment/detachment port 120.

Thereby, it is possible to simplify a configuration of the side surface 110, which is exposed by opening the front cover 11, of the apparatus body 100A. For example, the light-shielding member, not shown, described above can be omitted.

To be noted, while, in this embodiment, in the state in which the front cover 11 is positioned at the opening position, the user further manually moves the inner cover 13 from the closed position to the opening position, it is not limited to this. For example, it is acceptable to configure such that, by locating a center of gravity of the inner cover 13 on a side more forward than the pivot shaft 13*a*, that is, locating on a right side illustrated in FIG. 7A, the inner cover 13 is opened by its own weight when the front cover 11 is opened. Thereby, it is possible to improve the usability.

In addition, while, in this embodiment, the inner cover 13 is arranged more inside of the apparatus body 100A than the front cover 11, it remains unchanged that the front cover 11 closes (covers) the manual sheet feeding port 12 and the attachment/detachment port 120 at the closed position and opens (releases) the manual sheet feeding port 12 and the attachment/detachment port 120 at the opening position.

Third Embodiment

Next, while a third embodiment of this disclosure will be described, in the third embodiment, the front cover 11 of the first embodiment possesses a function of supporting the sheet that is manually fed. Therefore, configurations similar to the first embodiment will be described by omitting illustrations or by putting the same reference characters on drawings.

Figure 8:
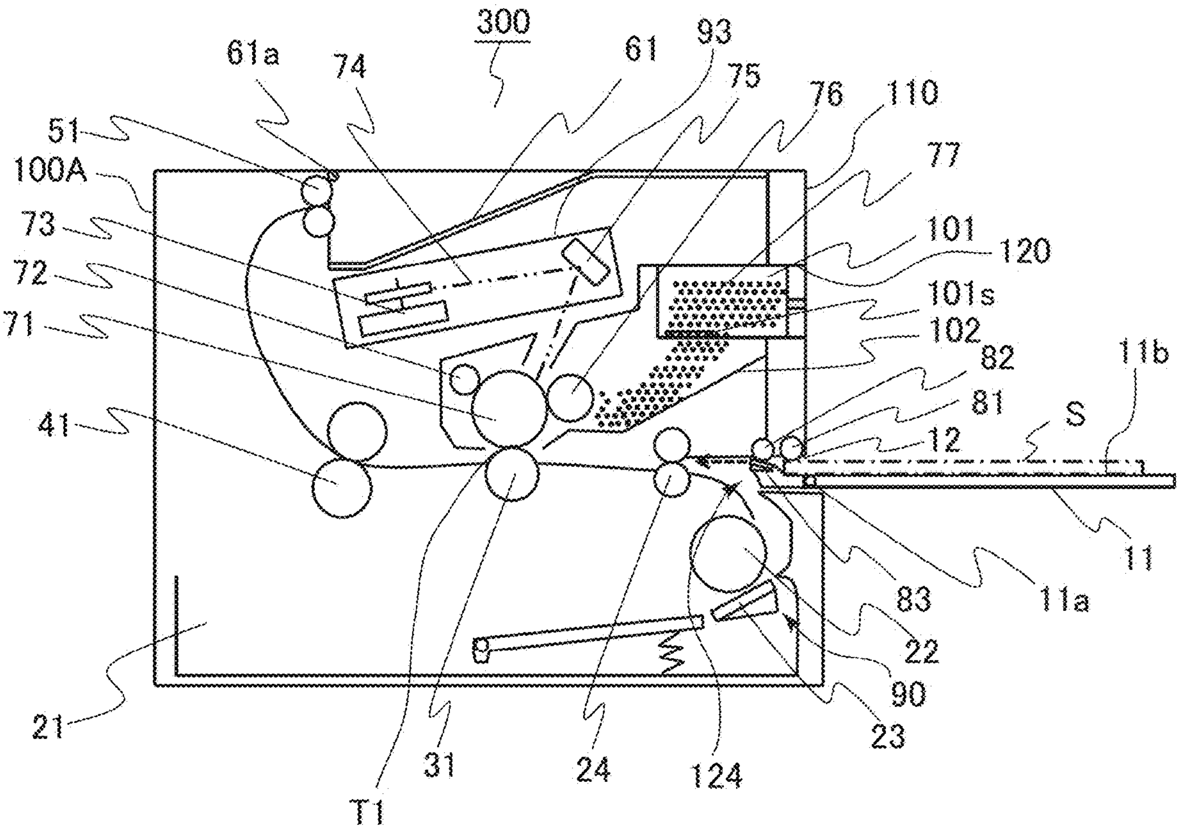
FIG. 8 is a cross-sectional view illustrating a printer of a third embodiment.

As illustrated in FIG. 8, a printer 300 of this embodiment includes a manual sheet feed portion 124, serving as a sheet feed portion. The manual sheet feed portion 124 includes a pickup roller 81, a feed roller 82, and a separation pad 83. In the state of being positioned at the opening position, the front cover 11 includes a supporting surface 11*b* on an upper surface side. The supporting surface 11*b* can support a plurality of sheets of the sheet S, not limited to a single sheet of the sheet S.

The sheet that has been supported by the supporting surface 11*b* of the front cover 11 is fed by the pickup roller 81, and is separated into one sheet at a time by the feed roller 82 and the separation pad 83. The sheet S that has been separated into one sheet at a time is conveyed to the conveyance roller pair 24, and, by undergoing the process similar to the case of being fed from the cassette 21 described above, the toner image is formed on the sheet S.

As described above, in this embodiment, the front cover 11 includes the supporting surface 11*b* that supports the sheet S, and possesses a function of a manual feed tray. Therefore, since the user does not need to maintain a state of holding the sheet S at a time of feeding the sheet manually, it is possible to improve the usability. To be noted, also in the first embodiment described in FIG. 5, it is acceptable to support the sheet S on the upper surface (back surface) of the front cover 11.

OTHER EMBODIMENTS

Figure 9A:
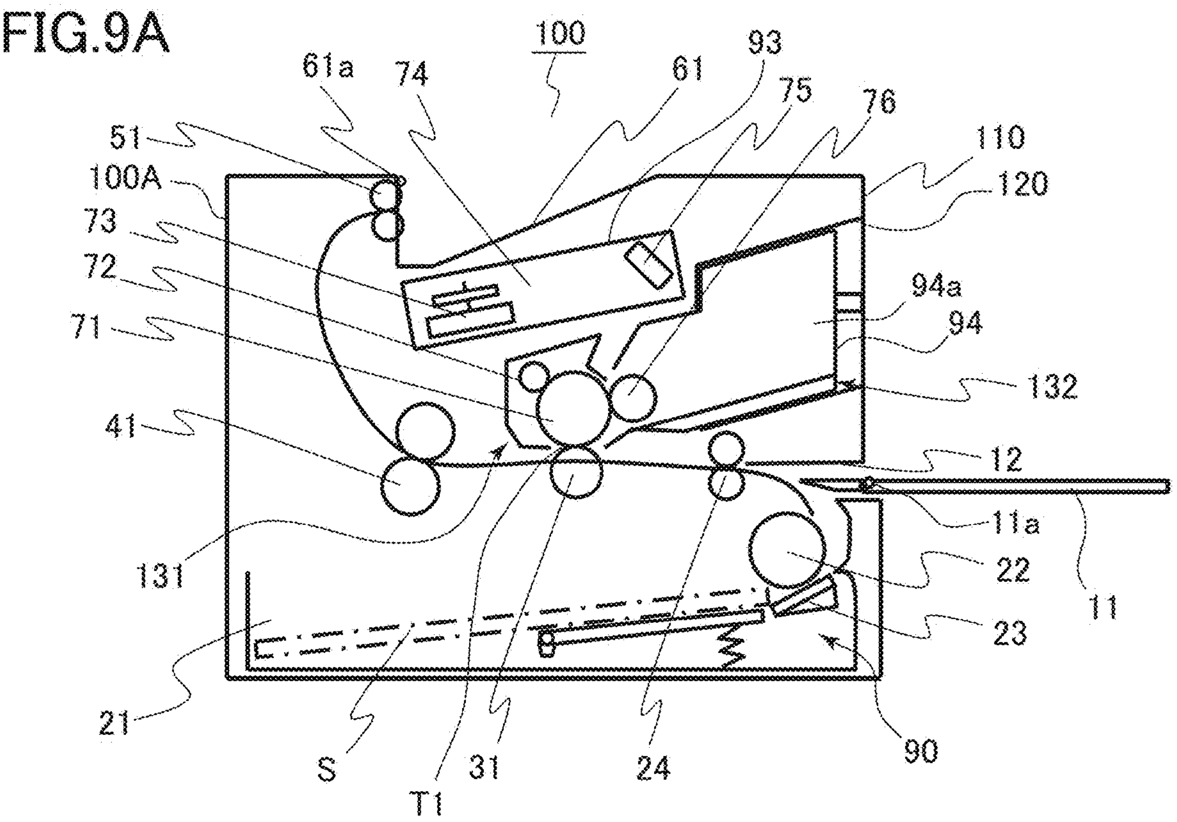
FIG. 9A is a cross-sectional view illustrating a developing cartridge.
Figure 9B:
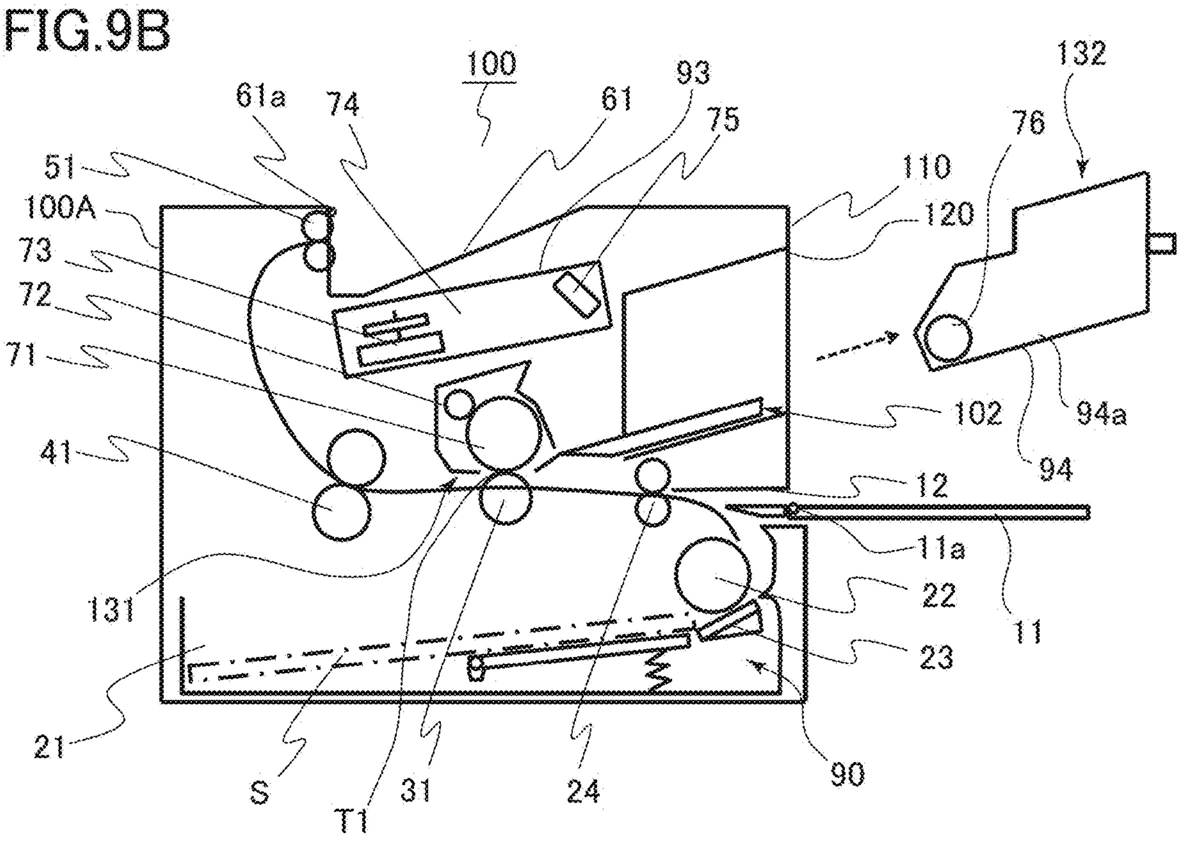
FIG. 9B is a cross-sectional view illustrating a state in which the developing cartridge is detached.

To be noted, while, in any of the embodiments described above, the attachment/detachment port 120 that is covered by the front cover 11 which is positioned at the closed position is used for replacing the toner cartridge 101, it is not limited to this. For example, as illustrated in FIGS. 9A and 9B, instead of the process cartridge 102 of FIG. 1, it is acceptable to dispose a drum cartridge 131 and a developing cartridge 132. The drum cartridge 131 includes the photosensitive drum 71 and the charge roller 72, and the developing cartridge 132, serving as the cartridge, includes the developing unit 94 including the developing roller 76 and the toner storage portion 94*a*. Then, it is acceptable to use the attachment/detachment port 120 at a time of attaching or detaching the drum cartridge 131 and the developing cartridge 132 either each separately or as a single unit. In addition, similar to the drum cartridge 131, the photosensitive drum 71 and the charge roller 72 do not need to be integrated into a cartridge, and may be disposed in a non-removal manner with respect to the apparatus body 100A.

Figure 10A:
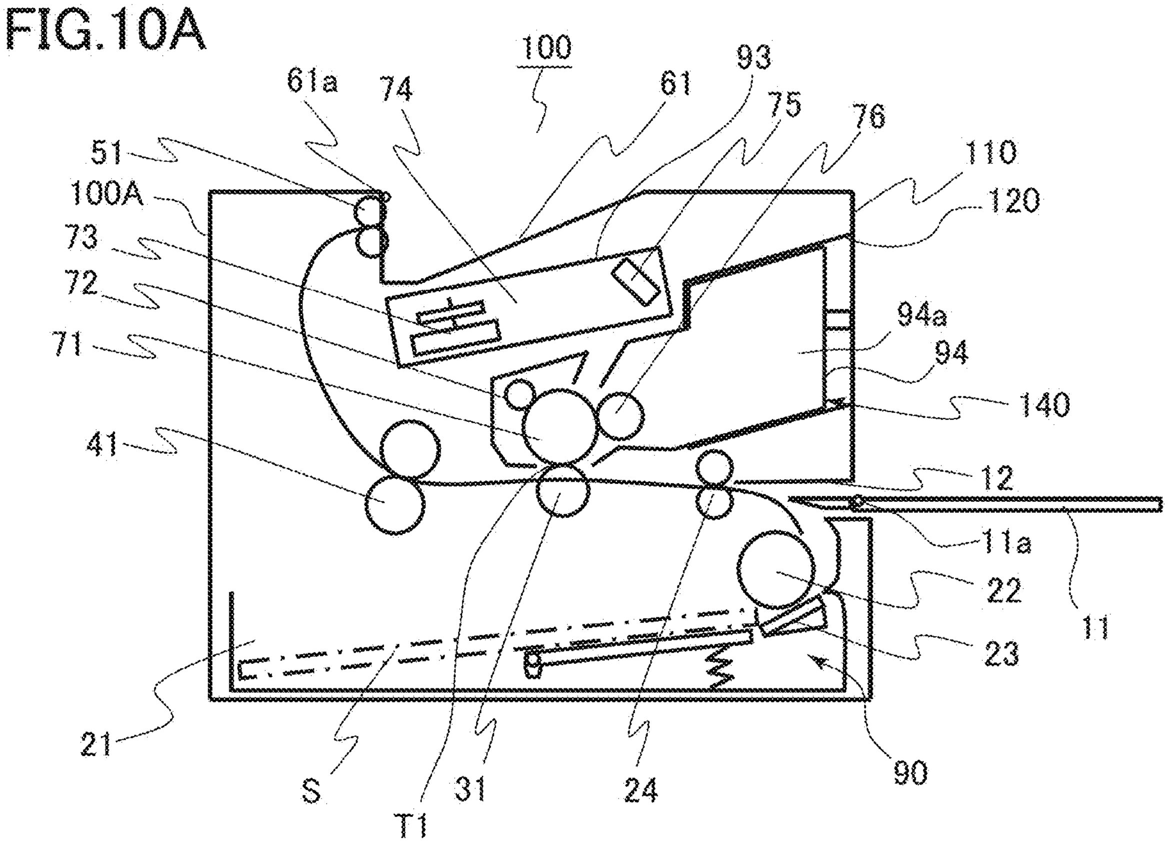
FIG. 10A is a cross-sectional view illustrating a process cartridge.
Figure 10B:
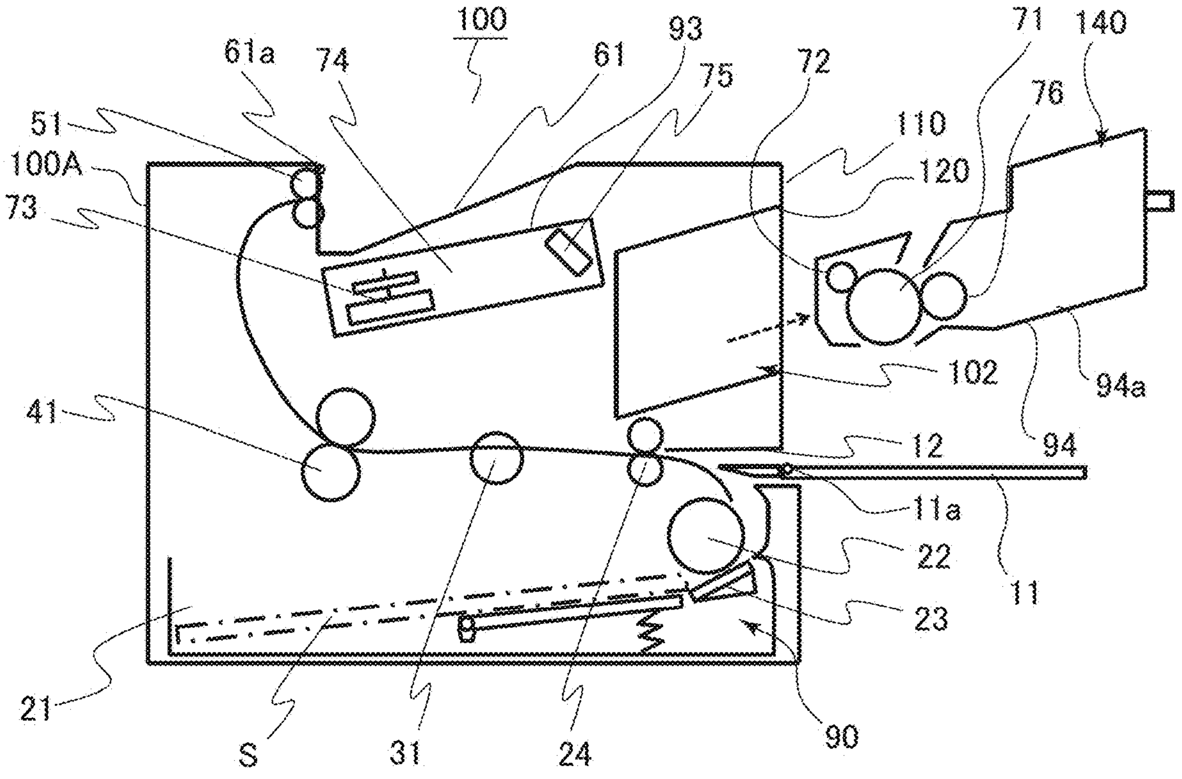
FIG. 10B is a cross-sectional view illustrating a state in which the process cartridge is detached.

Further, as illustrated in FIGS. 10A and 10B, the attachment/detachment port 120 may be also used at a time of attaching or detaching a process cartridge 140. That is, the process cartridge 140, serving as the cartridge, includes the photosensitive drum 71, the charge roller 72, and the developing unit 94 including the developing roller 76 and the toner storage portion 94*a*. That is, in the embodiments of FIGS. 9A to 10B, at least the toner storage portion 94*a* and the developing roller 76 are a part of the process cartridge that is attached or detached via the attachment/detachment port 120. Then, the process cartridge 140 passes through the attachment/detachment port 120 at the time of being attached or detached with respect to the apparatus body 100A. In addition, the process cartridge 102 of the first embodiment may be configured instead of the developing cartridge 132 described above. That is, the developing cartridge 132 may be attached or detached with respect to the apparatus body 100A via the process cartridge attachment/detachment port 130.

In addition, while, in any of the embodiments described above, the front cover 11 is configured to open and close the side surface 110 of the apparatus body 100A, it is not limited to this. For example, by disposing the attachment/detachment port 120 and the manual sheet feeding port 12 in the upper surface of the apparatus body 100A, it is acceptable to open and close this upper surface by a cover. Then, it is acceptable to configure such that the attachment/detachment port 120 and the manual sheet feeding port 12 are opened or closed by this single cover.

In addition, while, in any of the embodiments described above, the sheet S is separated into one sheet at a time using the separation pad 23 or 83, it is not limited to this. For example, the sheet S may be separated into one sheet at a time by using a separation roller or a retard roller having a built-in torque limiter. In addition, also a method of feeding the sheet S is not limited to the embodiments described above. For example, the sheet S may be fed by a sheet feed unit of an air adsorption method in which the sheet S is conveyed while undergoing suction with negative pressure.

In addition, while, in any of the embodiments described above, the descriptions are provided using the printer 100, serving as the image forming apparatus, this disclosure is not limited to this. The term "image forming apparatus" includes a printer, a copier, a facsimile, and a multifunction machine, and refers to an apparatus that forms the image on the sheet, serving as a recording medium, based on image information input from an external personal computer (PC) or image information read from a document. Further, while, in the image forming apparatus, in addition to a main body that possesses an image forming function, sometimes, an auxiliary apparatus such as an option feeder, an image reading apparatus, and a sheet processing apparatus is interconnected, an entire system in which such an auxiliary apparatus is interconnected is recognized as a type of the image forming apparatus. This disclosure may be applied to such an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-131801, filed Aug. 14, 2023, which is hereby incorporated by reference herein in its entirety.

What is claimed is:

1. An image forming apparatus comprising:

an apparatus body including a sheet feeding unit that is configured to feed a sheet;

an insertion port that is disposed in the apparatus body and in which the sheet fed by sheet feeding unit is inserted;

a cartridge that is configured to store toner with which an image is formed on the sheet, the cartridge being attachably and detachably supported by the apparatus body;

an attachment/detachment port that is disposed in the apparatus body and through which the cartridge passes in a case where the cartridge is attached to or detached from the apparatus body; and a cover that is openably and closably supported by the apparatus body and is configured to move to a first position where the cover closes the insertion port and the attachment/detachment port and a second position where the cover opens the insertion port and the attachment/detachment port, wherein, in a state in which the cover is positioned at the second position, the sheet feeding unit is capable of feeding the sheet that has been inserted to the insertion port, and the cartridge is capable of being attached to and detached from the apparatus body via the attachment/detachment port, and wherein the attachment/detachment port is shorter than the insertion port in a longitudinal direction of the cartridge.

2. The image forming apparatus according to claim 1, wherein the apparatus body includes a side surface extending in a gravity direction, wherein the insertion port and the attachment/detachment port are disposed in the side surface, and wherein the cover is an exterior member that is configured to cover the side surface of the apparatus body at the first position.

3. The image forming apparatus according to claim 2, wherein the insertion port and the attachment/detachment port are configured to open in a direction perpendicular to the gravity direction.

4. The image forming apparatus according to claim 1, further comprising an inner cover openably and closably supported by the apparatus body, the inner cover being configured to move to a third position where the inner cover covers the attachment/detachment port and a fourth position where the inner cover opens the attachment/detachment port, wherein the inner cover is arranged more inside of the apparatus body than the cover which is positioned at the first position.

5. The image forming apparatus according to claim 1, wherein the cover includes a supporting surface configured to support the sheet which is inserted to the insertion port.

6. The image forming apparatus according to claim 1, further comprising an image bearing member that is configured to bear an electrostatic latent image, wherein the cartridge is a developing cartridge including:

a toner storage portion configured to store toner; and a developing roller configured to develop the electrostatic latent image borne on the image bearing member as a toner image by using the toner stored in the toner storage portion.

7. The image forming apparatus according to claim 1, wherein the cartridge is a process cartridge including:

an image bearing member configured to bear an electrostatic latent image;

a toner storage portion configured to store toner; and a developing roller configured to develop the electrostatic latent image borne on the image bearing member as a toner image by using the toner stored in the toner storage portion.

8. An image forming apparatus comprising:

an apparatus body including a sheet feeding unit that is configured to feed a sheet;

an insertion port that is disposed in the apparatus body and in which the sheet fed by sheet feeding unit is inserted;

a cartridge that is configured to store toner with which an image is formed on the sheet, the cartridge being attachably and detachably supported by the apparatus body:

an attachment/detachment port that is disposed in the apparatus body and through which the cartridge passes in a case where the cartridge is attached to or detached from the apparatus body;

a cover that is openably and closably supported by the apparatus body and is configured to move to a first position where the cover closes the insertion port and the attachment/detachment port and a second position where the cover opens the insertion port and the attachment/detachment port;

an image bearing member that is configured to bear an electrostatic latent image;

a toner storage portion that is configured to store the toner; and a developing roller that is configured to develop the electrostatic latent image borne on the image bearing member as a toner image by using the toner stored in the toner storage portion, wherein, in a state in which the cover is positioned at the second position, the sheet feeding unit is capable of feeding the sheet that has been inserted to the insertion port, and the cartridge is capable of being attached to and detached from the apparatus body via the attachment/detachment port, and wherein the cartridge is a toner cartridge that is configured to supply the toner to the toner storage portion.

9. The image forming apparatus according to claim 8, wherein at least the toner storage portion and the developing roller are configured to be attached to and detached from the apparatus body as a part of a process cartridge.

10. The image forming apparatus according to claim 9, wherein the process cartridge includes the image bearing member.

11. The image forming apparatus according to claim 9, wherein the attachment/detachment port and the cover are respectively a first attachment/detachment port and a first cover, and the image forming apparatus further comprises:

a second attachment/detachment port that is disposed in the apparatus body and through which the process cartridge passes in a case where the cartridge is attached to or detached from the apparatus body; and a second cover that is openably and closably supported by the apparatus body and is configured to move to a third position where the second cover closes the second attachment/detachment port and a fourth position where the second cover opens the second attachment/detachment port.

12. The image forming apparatus according to claim 11, further comprising an exposure unit that is supported by the second cover and is configured to expose the image bearing member.

13. The image forming apparatus according to claim 11, wherein the apparatus body includes a sheet discharge unit that is configured to discharge the sheet outside of the image forming apparatus, and wherein the second cover includes a supporting surface that is configured to support the sheet discharged outside by the sheet discharge unit.

* * * * *